March 11, 1930.  T. STAARUP  1,749,787
GEAR WHEEL ROUNDING APPARATUS
Filed Oct. 1, 1928
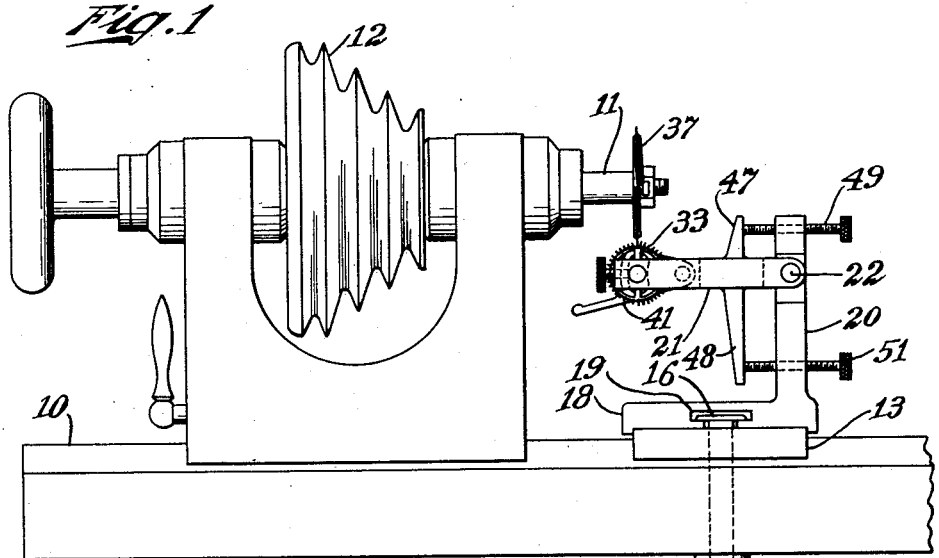
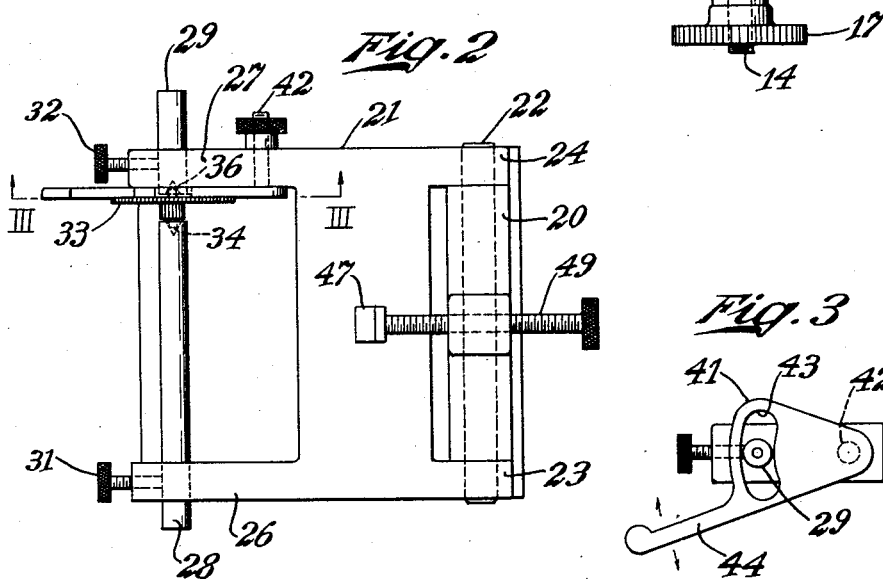
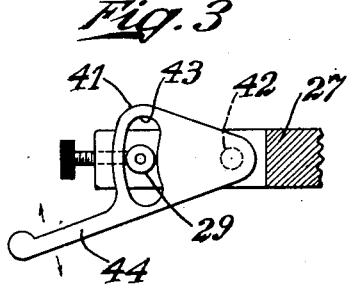
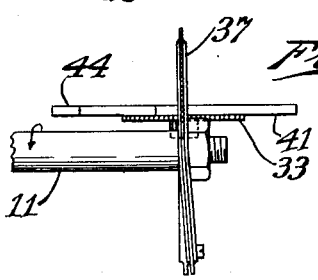
Inventor
*Thomas Staarup*
By *Johnston & Jennings*
Attorneys Patented Mar. 11, 1930

1,749,787

UNITED STATES PATENT OFFICE

THOMAS STAARUP, OF BIRMINGHAM, ALABAMA

GEAR-WHEEL-ROUNDING APPARATUS

Application filed October 1, 1928. Serial No. 309,628.

My invention relates to apparatus for rounding up small gear wheels such as are used in watches and clocks and has for its object the provision of means of the character designated whereby small gear wheels may be readily and quickly mounted and rounded up.

A further object of my invention is to provide a gear wheel rounding apparatus by means of which small gears may be readily and quickly mounted and rounded up and which apparatus may be readily attached to and detached from a watchmaker's lathe.

A still further object of my invention is to provide apparatus for rounding small gear wheels which shall be simple of design and economical of manufacture and which shall be effective to expeditiously perform the operations for which it is intended.

As is well understood in the art to which my invention relates, small gear wheels for watches and clocks, with present day methods of automatic machine manufacture and quantity production, are frequently found which are not truly round, or in which the gear teeth are not cut to that uniformity of depth required for an accurate time piece. Where such a condition is found, the time piece does not keep good time or else will stop unless fully wound up. In order to repair such a time piece, it is necessary that the defective wheel be removed and replaced or else rounded up so that the teeth are of a uniform depth.

While some devices have been heretofore proposed for accomplishing this purpose, those with which I am familiar are quite complicated in character, expensive to manufacture and difficult to operate. It is accordingly a prime object of my invention to provide a simple, economical apparatus which may be readily operated by the average watchmaker by attaching it to the ordinary watchmaker's lathe and which shall accurately and expeditiously perform its duty of rounding up defective wheels.

Briefly, my invention comprises a base adapted for adjustable attachment to a lathe bed whereby it may be moved longitudinally and laterally of the bed. Mounted on the mandrel of the lathe is a rotary indexing cutter. Carried by the base is a U-shaped swinging frame having means to mount and center a gear wheel thereon adjacent to the cutter. Means are provided on the base for vertically adjusting the position of the U-frame with respect to the cutter, said means being adapted to provide micrometer adjustments of the frame so as to provide the degree or depth of cutting necessary for the gear wheel. In order to avoid damage to the gear wheel by reason of the rapidly rotating cutter, I provide a guard member which is adjustably pivoted to the U-frame and adapted to bear against the gear wheel on the side thereof remote from the cutter.

Apparatus embodying features of my invention is illustrated in the accompanying drawings, forming a part of this application, wherein Fig. 1 is a side elevation of a watchmaker's lathe having my improved attachment mounted thereon;

Fig. 2 is a plan view of the attachment;

Fig. 3 is a fragmentary view of one arm of the U-frame showing my improved guard member for protecting the gear wheel; and Fig. 4 is a fragmentary plan view showing the relation of the rotary cutter to the gear wheel and guard member.

Referring to the drawings for a better understanding of my invention, I show a lathe comprising a bed 10 and a mandrel 11 which is rotated in the direction shown by the arrow in Fig. 4, by any suitable power means, not shown, through any one of a series of pulleys 12. Carried by the bed 10 is the usual slide rest holder 13 which is slidable on the bed 10 and is held in position by a bolt 14 having a button head 16 and a knurled nut 17 on the bottom thereof.

Mounted on the slide rest 13 is my improved apparatus which will now be described. The apparatus comprises a base 18 provided with an undercut transverse groove 19 in which the button head 16 of the bolt 14 fits. The groove 19 extends from side to side of the base 18 whereby the apparatus may be adjusted transversely of the bed 10 while the slide rest 13 provides longitudinal adjustment thereof. Extending vertically from the base 18 is a standard 20 which carries a work frame 21, the latter being pivoted to the standard 20 by means of a pin 22 extending through the standard and the frame, the latter being provided with short arms 23 and 24 which bear against the sides of the standard and through which the pin 22 extends.

The forward end of the frame 21 is forked to provide a U-shaped frame having arms 26 and 27 extending toward the mandrel 11 and which carry opposed gear wheel mounting and centering devices in the form of transversely extending shafts 28 and 29 which are held in place in the arms 26 and 27 by means of set screws 31 and 32 respectively.

In use, a gear wheel 33 is mounted with its hubs 34 and 36 extending into centering holes provided in the members 28 and 29 and closely adjacent to the arm 27. An indexing cutter 37, such as is well known in the art, is mounted on the mandrel 11 and the gear wheel 33 is brought in juxtaposition to the cutter 37 so that the cutter may be brought to bear uniformly between the teeth of the gear wheel.

In order to protect the gear wheel against bending, due to action of the cutter 37, I provide a guard member 41 on the side of the gear wheel 33 remote from the vertical plane passing through the axis of the cutter and which is pivoted to the arm 27 by means of a set screw 42 whereby it may be fixed in any desired position. The rotation of the cutter being in the direction shown, the action of the cutter is to urge the gear wheel toward the guard member 41. The guard member 41 is provided with an arcuate opening 43 therein which surrounds the inner end of the shaft 29 and is provided with a handle 44 whereby it may be swung to the required height behind the gear wheel 33 and with its top edge just below the bottom of the gear teeth. The action of the cutter is thus prevented from bending the gear wheel when the apparatus is in operation.

In order that the frame 21 may be adjusted vertically with respect to the cutter 37, I provide an upwardly extending screw abutment 47 and a downwardly extending screw abutment 48 on the frame 21 and provide adjusting screws 49 and 51 in the standard 20 which bear respectively against the abutments 47 and 48. Both the screws 49 and 51 are provided with fine threads in order to provide micrometer adjustments, while the abutment 48 is made purposely as long as possible so as to provide still closer adjustments with the screw 51.

While I have shown my invention in but one form, it will be obvious to those skilled in the art that it is not so limited but is susceptible of various changes and modifications, without departing from the spirit thereof, and I desire therefore that only such limitations shall be placed thereupon as are imposed by the prior art, or as are specifically set forth in the appended claims.

What I claim is:

1. In a gear wheel rounding up attachment for lathes having a rotary mandrel and a bed, an indexing cutter mounted on the mandrel, a base adjustably mounted on the lathe bed and adapted to be moved longitudinally and transversely thereof, a U-frame pivotally mounted on the base and having its open end facing the cutter, gear wheel mounting and centering means carried by the U-frame and adapted to position a gear wheel in the path of the cutter and transversely thereof, and a pivoted guard member carried by the U-frame and bearing against the gear wheel on the side thereof opposite the direction of approach of the cutter.

2. In a gear wheel rounding up attachment for lathes having a rotary mandrel and a bed, a rotary indexing cutter mounted on the mandrel, a base adjustably mounted on the lathe bed and adapted to be moved longitudinally and transversely thereof, a U-frame pivotally mounted on the base and having its open end facing the cutter, gear wheel mounting and centering means carried by the U-frame and adapted to position a gear wheel in the path of the cutter and transversely thereof, an adjustable guard member carried by the U-frame and bearing against the gear wheel on the side thereof opposite the direction of approach of the cutter, and means for vertically adjusting the position of the U-frame with respect to the cutter.

In testimony whereof I affix my signature.

THOMAS STAARUP.